May 15, 1928. 1,669,785
O. G. SCHMITT
AUTOMATIC GLOVE SEWING MACHINE
Filed March 13, 1925 14 Sheets-Sheet 4
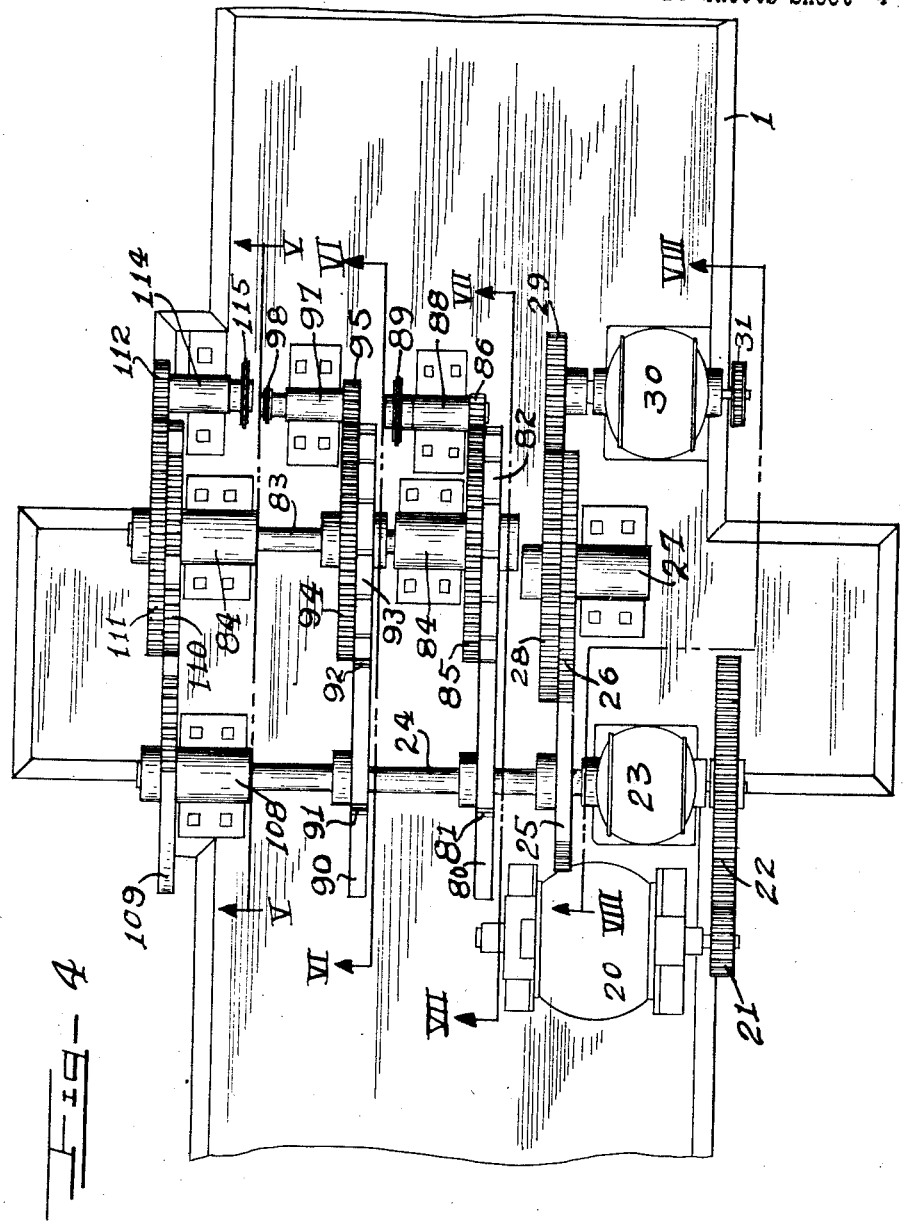

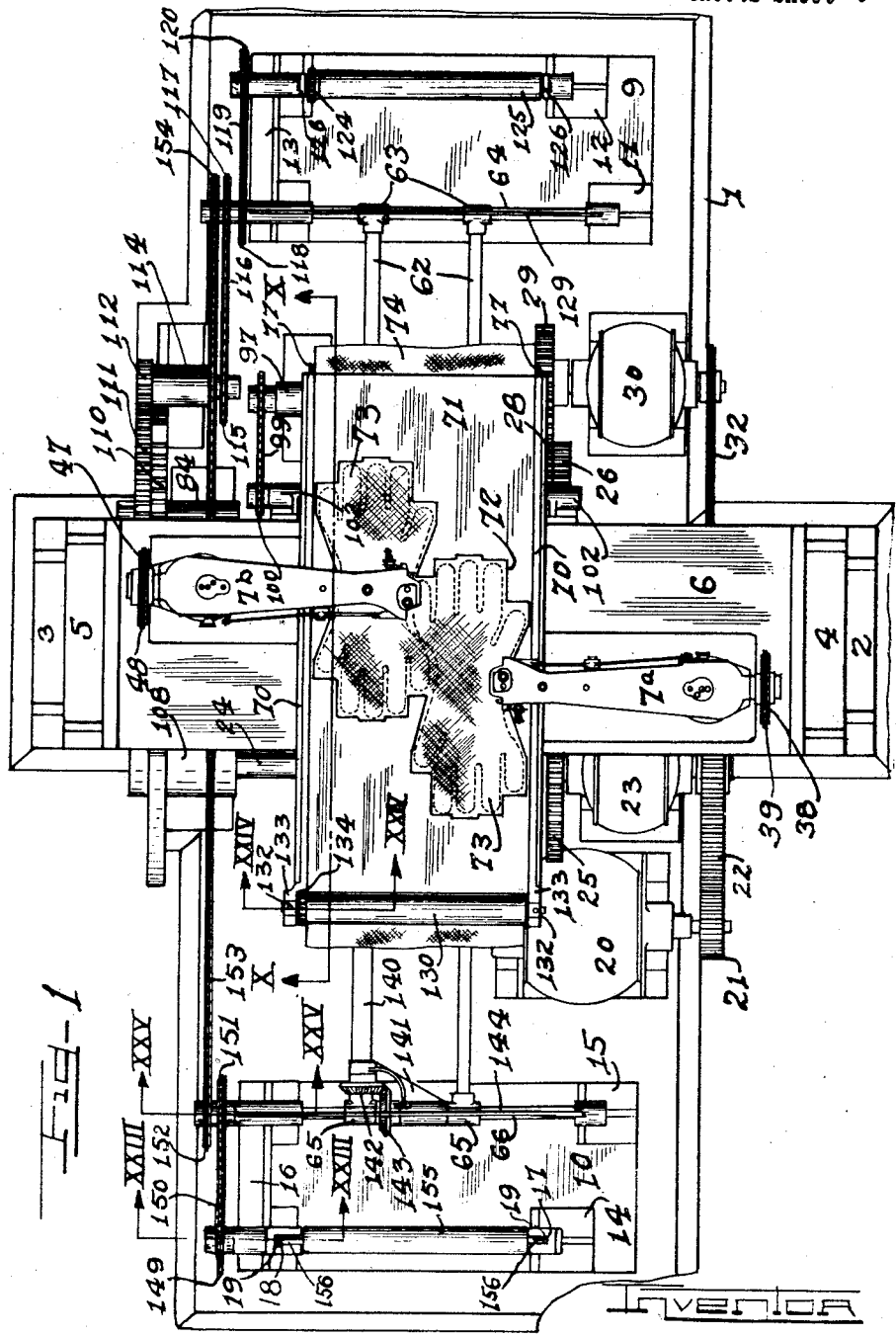

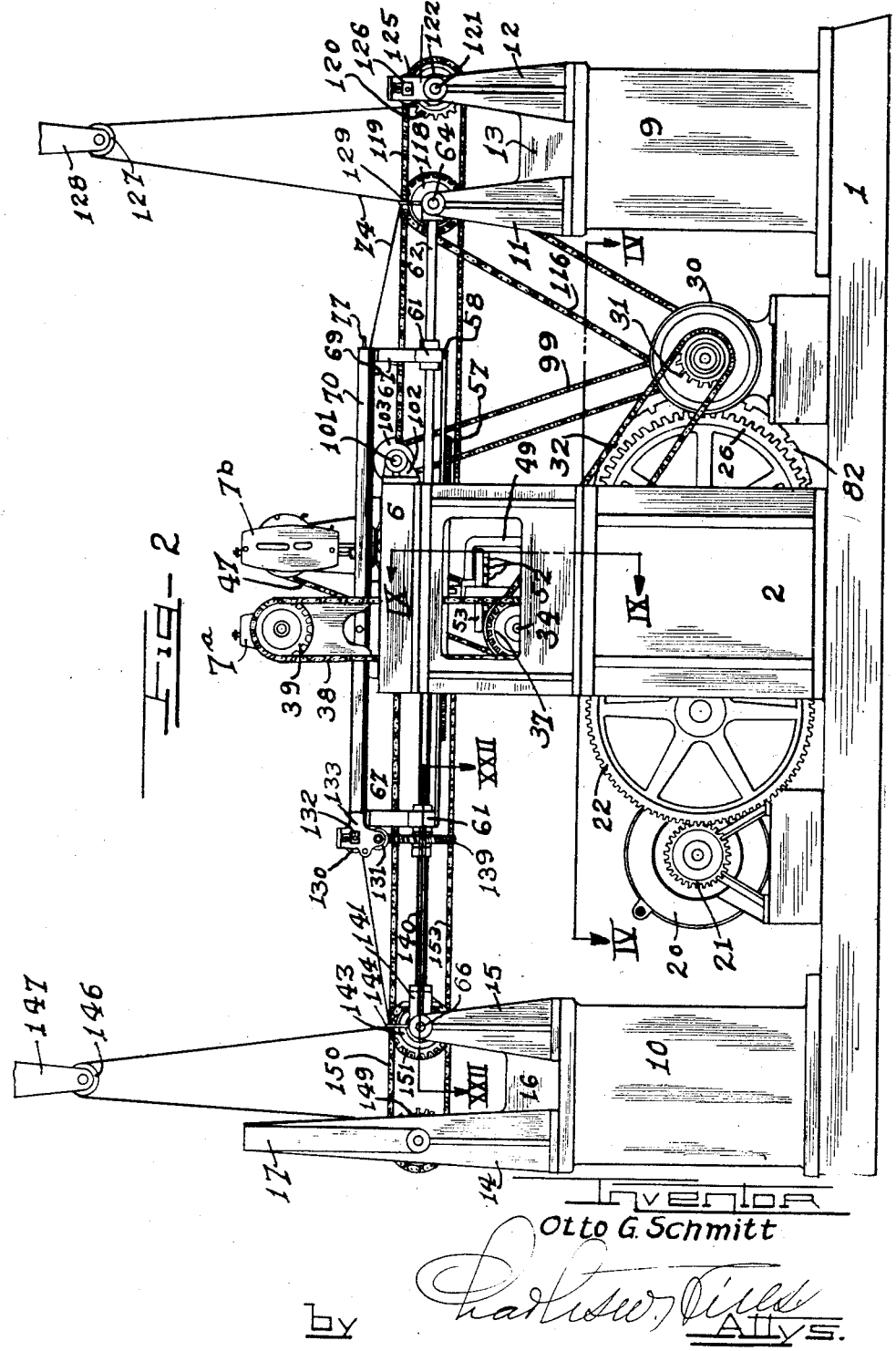

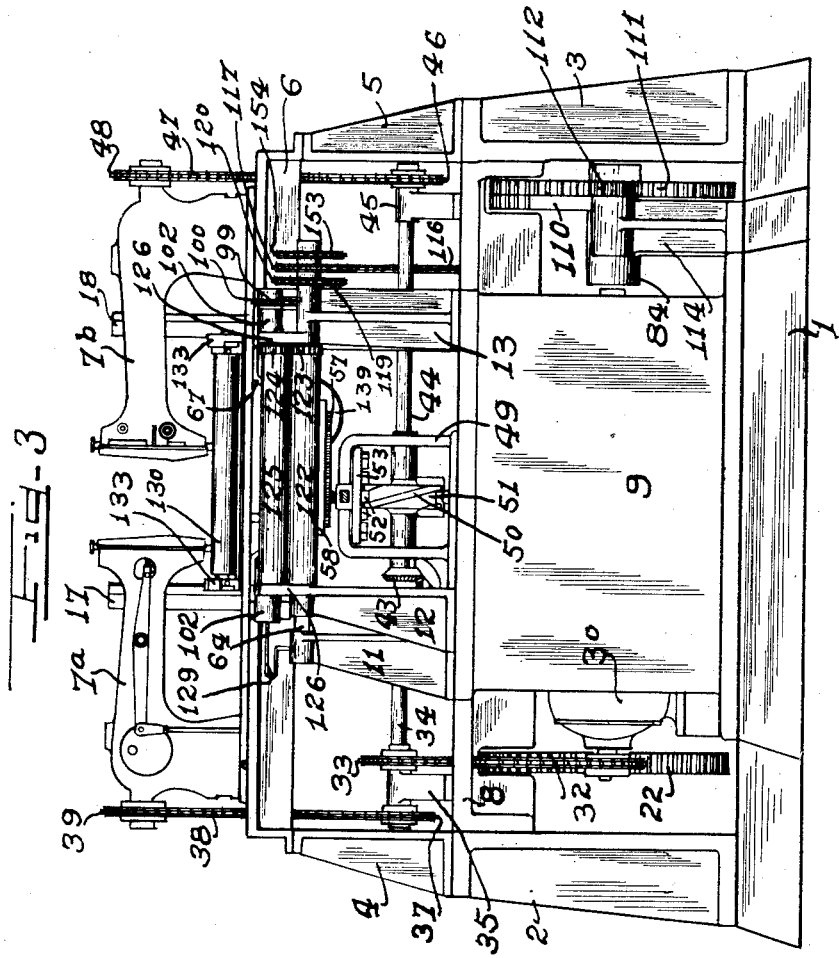

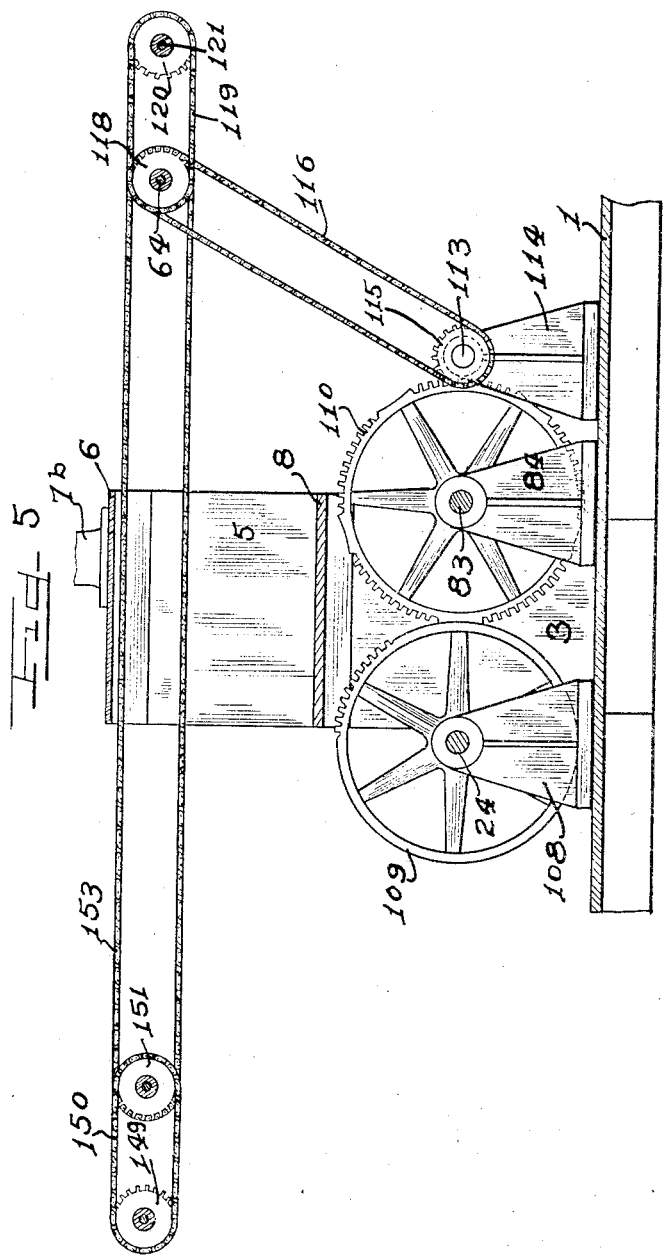

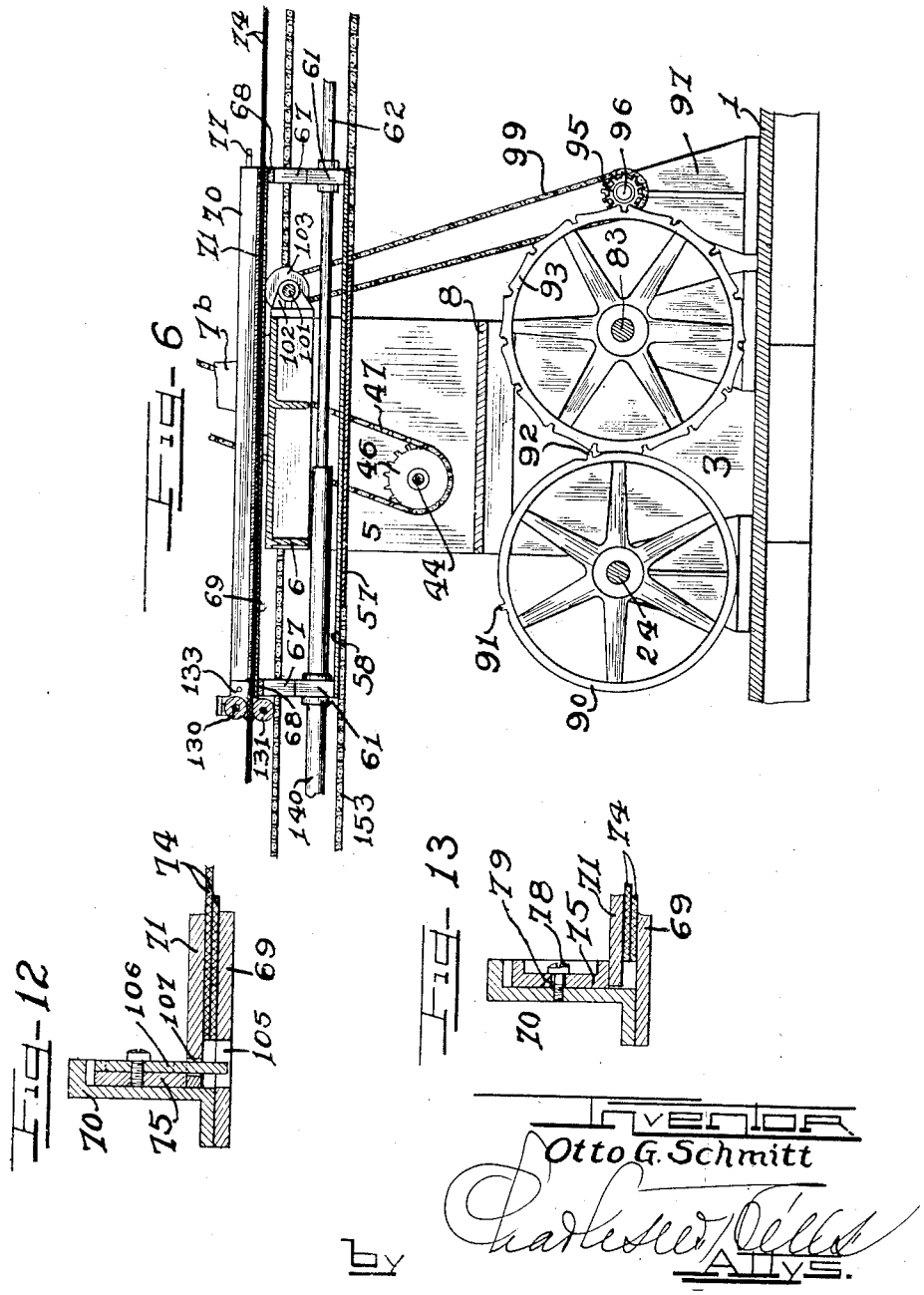

May 15, 1928.　　　　　　　　　　　　　　　　　1,669,785
O. G. SCHMITT
AUTOMATIC GLOVE SEWING MACHINE
Filed March 13, 1925　　　14 Sheets-Sheet 7
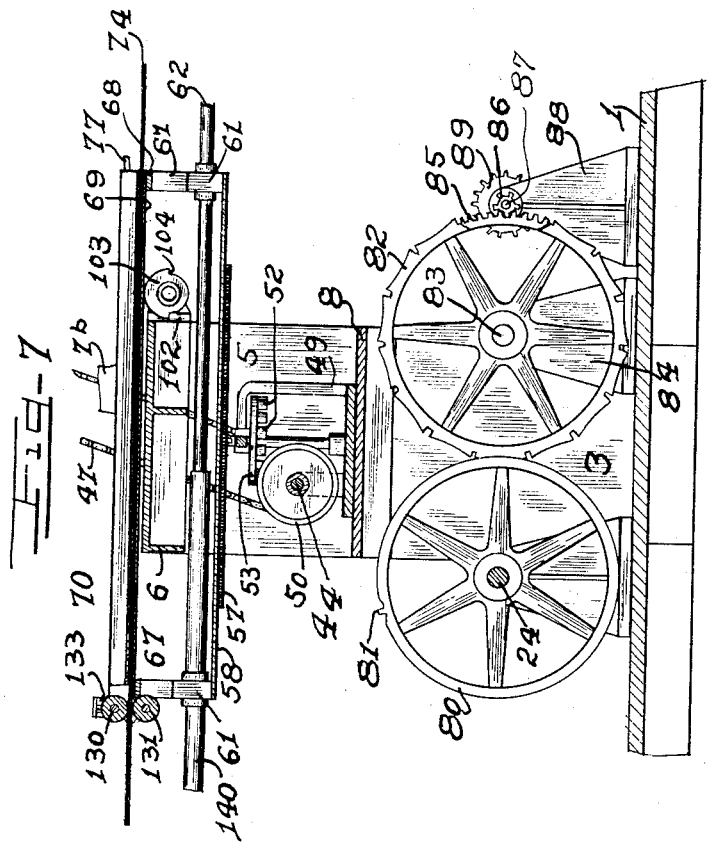
Inventor
Otto G. Schmitt
by

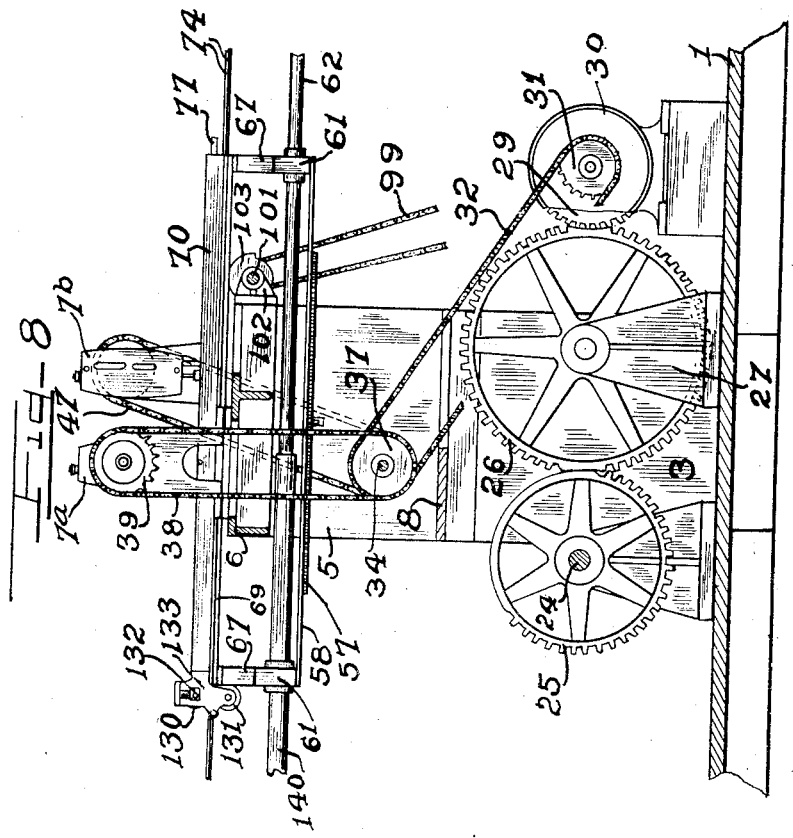

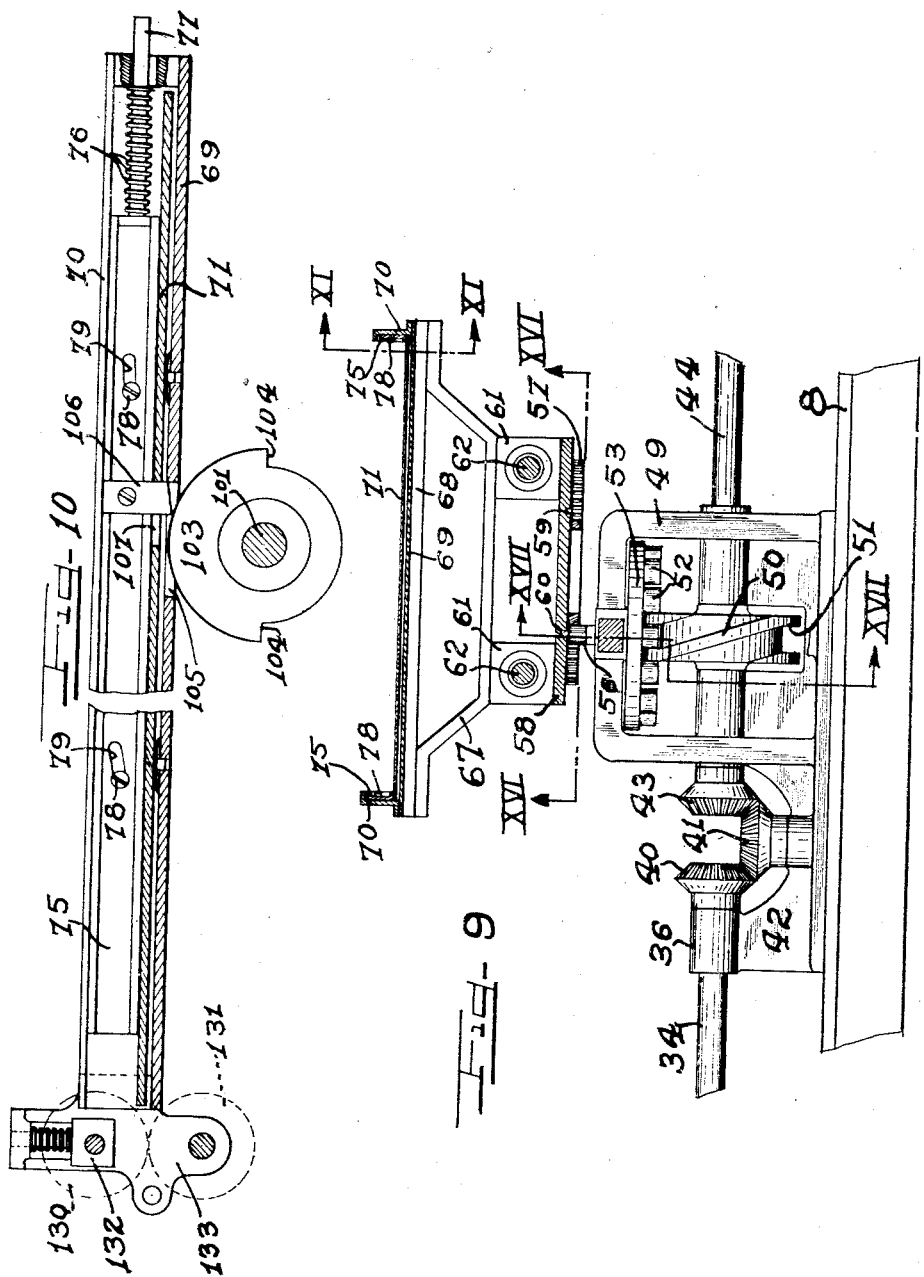

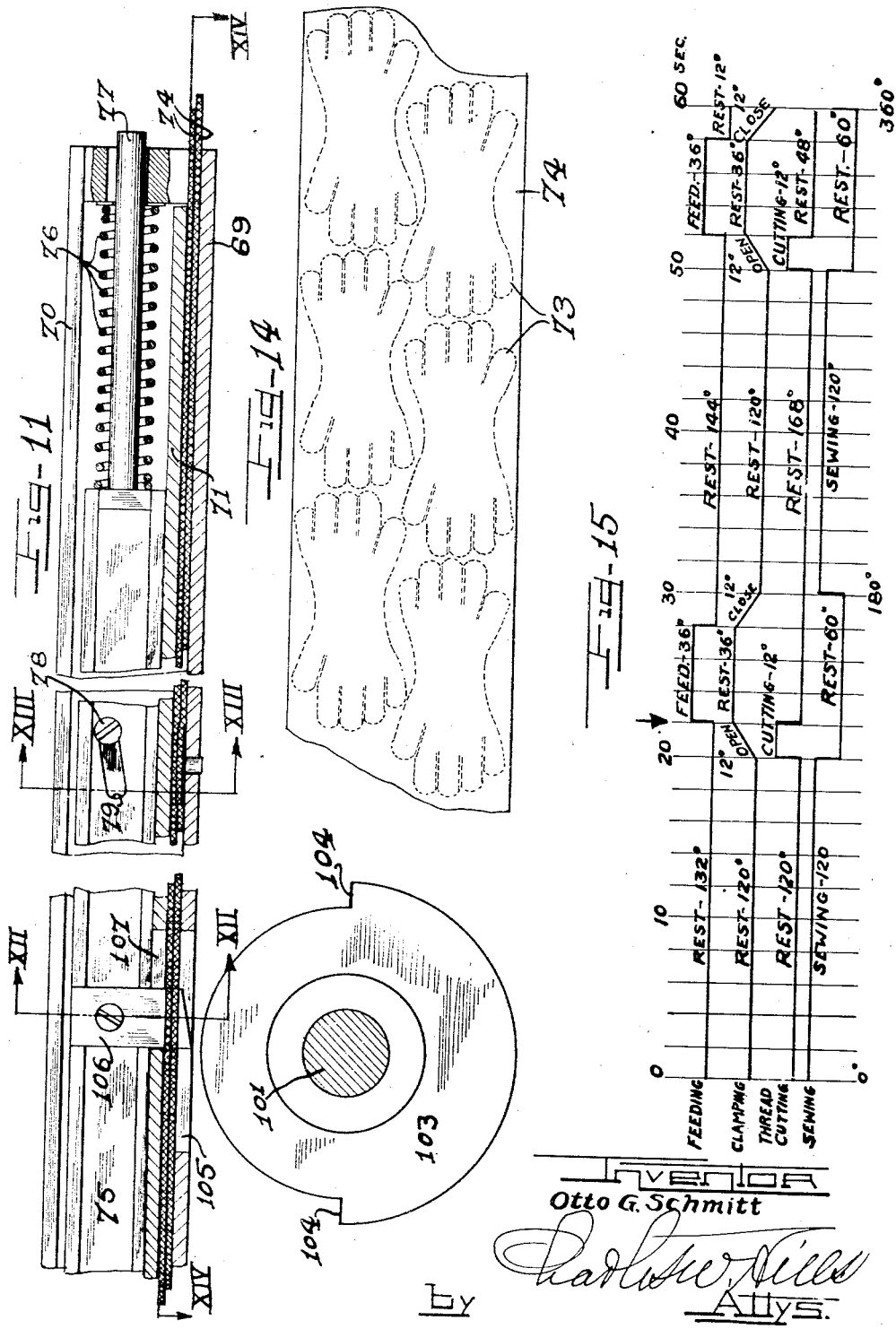

May 15, 1928.  
O. G. SCHMITT  
1,669,785  
AUTOMATIC GLOVE SEWING MACHINE  
Filed March 13, 1925    14 Sheets-Sheet 11
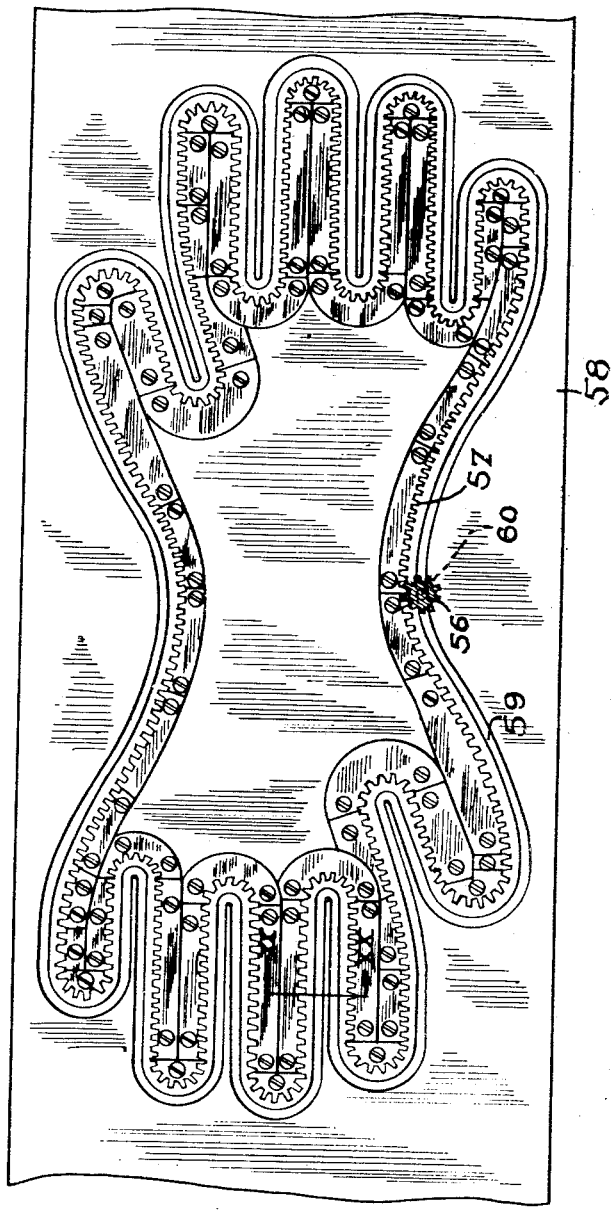

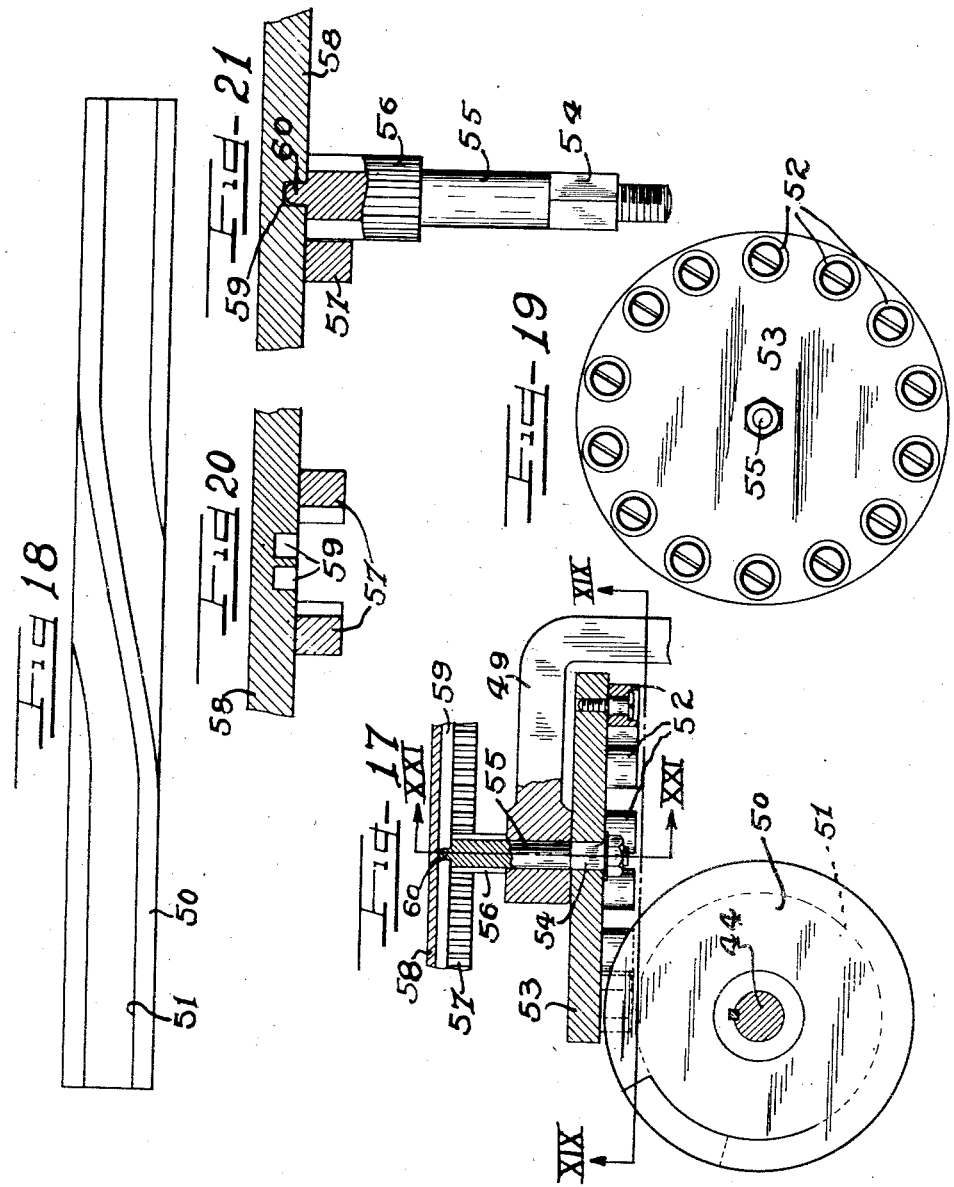

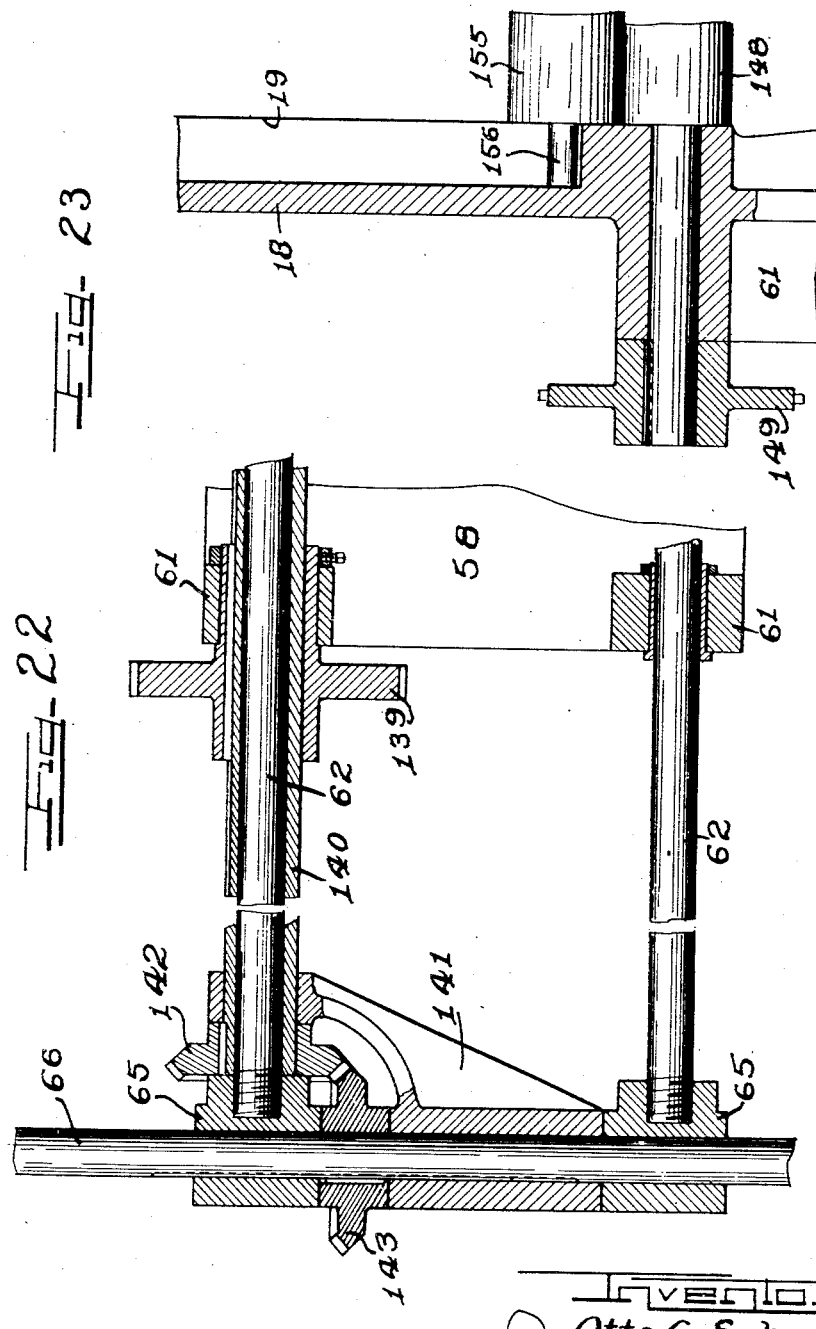

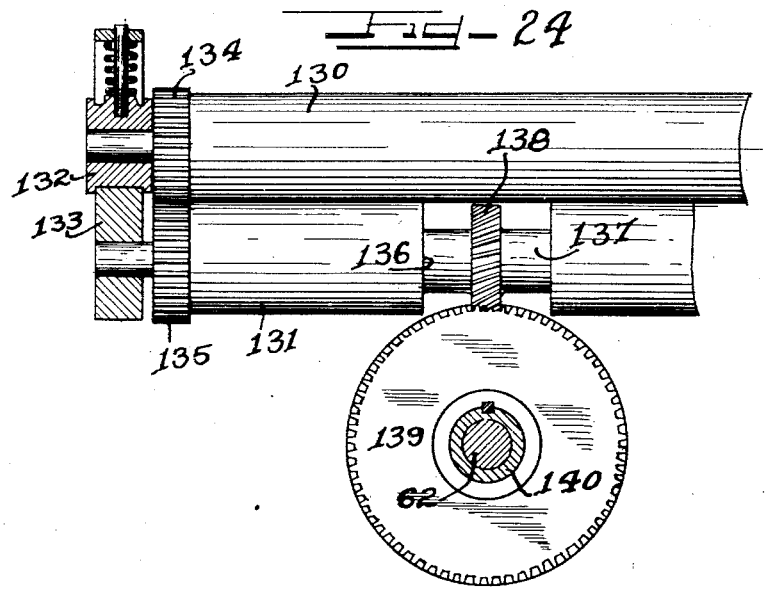
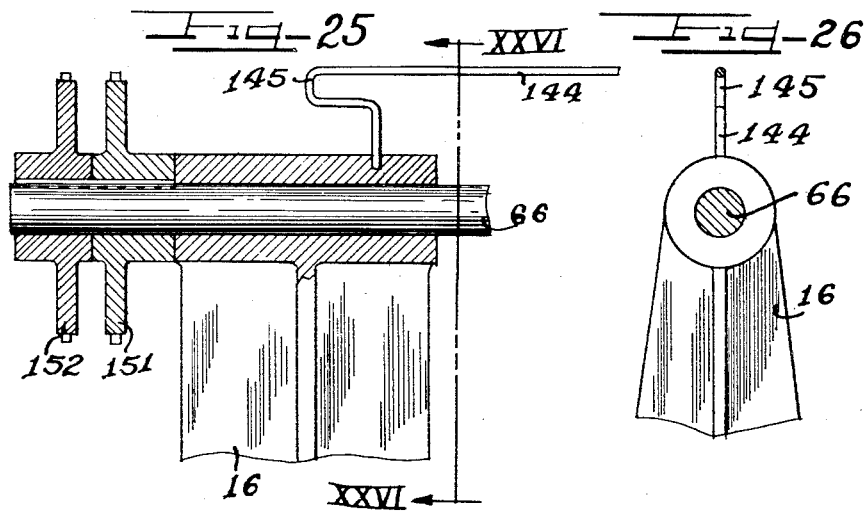

Patented May 15, 1928.

1,669,785

UNITED STATES PATENT OFFICE.

OTTO G. SCHMITT, OF CHICAGO, ILLINOIS.

AUTOMATIC GLOVE-SEWING MACHINE.

Application filed March 13, 1925. Serial No. 15,257.

In glove sewing machines now in commercial use the output of gloves is restricted, due to the fact that the machines are of the handfeed type so that the full efficiency of the machines can not be obtained since the operators can not continuously feed the cloth or material into the machines as fast as the sewing needles operate, said speed being approximately three thousand stitches per minute.

This invention relates to an improved automatic glove sewing machine wherein the handfeed by the operator is eliminated and replaced by automatic feeding mechanisms adapted to rapidly feed the cloth or material into the field of operation of the sewing needles at a speed of substantially three thousand stitches per minute thereby producing a machine of increased output and high efficiency.

It is a further object of the invention to provide a glove sewing machine with a tracer, pinion and pattern rack to permit the material to be sewed to be automatically fed into the machine at a rate of speed equal to the speed of the stitching mechanisms to increase the efficiency of the machine.

It is furthermore an object of this invention to provide a glove sewing machine with an automatic pattern tracer mechanism and with an automatic material feed to permit a plurality of layers of materials to be sewed reproducing an exact stitched copy of the original pattern in the material.

Another object of the invention is the production of a glove sewing machine in which the material is first sewed according to a predetermined double glove pattern, after which the sewed material is discharged from the machine and delivered to a cutting or punch machine which cuts out the sewed gloves.

It is still another object of the invention to provide a glove machine in which a pair of superimposed strips of material are automatically fed in clamped relation into the field of operation of a plurality of sewing needles to permit a plurality of double glove patterns to be stitched in staggered relation in the material.

Still another object of the invention is to provide a glove making machine having a continuous rack in the form of a glove pattern, said rack provided with a co-acting tracer pinion controlling the operation of a movable sewing table carrying the material to be stitched with glove outlines.

Another object of the invention is the construction of a glove stitching machine having a plurality of sewing machine units operating in synchronism so that the needles of said sewing machine units will simultaneously sew a plurality of glove patterns in staggered relation on the same stretch of material.

It is an important object of this invention to provide a simplified glove stitching machine having a tracing pattern adapted to control the movement of a cloth carrying table so that the table will be automatically moved through a predetermined path to permit sewing devices to stitch glove outlines in the cloth.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of the glove sewing machine.

Figure 2 is a front elevation of the machine.

Figure 3 is an end elevation of the entrance end of the machine.

Figure 4 is a fragmentary plan view taken on line IV—IV of Figure 2 with parts omitted.

Figure 5 is a fragmentary vertical section taken on line V—V of Figure 4 showing the cloth feeding gears.

Figure 6 is a fragmentary vertical section taken on line VI—VI of Figure 4 showing the cloth clamping gears.

Figure 7 is a fragmentary vertical section taken on line VII—VII of Figure 4 showing the thread cutting gears.

Figure 8 is a fragmentary vertical section taken on line VIII—VIII of Figure 4 showing the sewing gears.

Figure 9 is an enlarged vertical detail section taken on line IX—IX of Figure 2 with parts omitted.

Figure 10 is an enlarged vertical detail section of the cloth clamping plate and cloth carrying table taken taken on line X—X of Figure 1.

Figure 11 is an enlarged fragmentary detail section taken on line XI—XI of Figure 9.

Figure 12 is a fragmentary detail section taken on line XII—XII of Figure 11.

Figure 13 is a fragmentary detail section taken on line XIII—XIII of Figure 11.

Figure 14 is a plan view of a fragmentary portion of the cloth stitched with glove patterns.

Figure 15 is a time chart of the movements of the machine.

Figure 16 is a bottom plan view of the glove rack pattern taken on line XVI—XVI of Figure 9 showing the tracer pinion in section.

Figure 17 is a fragmentary detail section taken on line XVII—XVII of Figure 9 and illustrating the sewing feed control mechanisms.

Figure 18 is a developed plan of the peripheral surface of the control cam disk governing the feed of the cloth to the sewing needles.

Figure 19 is a bottom plan view of the feed control disk controlling the tracer pinion and the cloth feed table.

Figure 20 is a fragmentary detail section of the tracer rack taken on line XX—XX of Figure 16.

Figure 21 is a detail section taken on line XXI—XXI of Figure 17.

Figure 22 is an enlarged fragmentary detail section taken on line XXII—XXII of Figure 2 with parts in elevation.

Figure 23 is an enlarged fragmentary detail section taken on line XXIII—XXIII of Figure 1.

Figure 24 is a fragmentary detail section taken on line XXIV—XXIV of Figure 1 with parts in elevation illustrating the cloth feed rolls and driving means therefor.

Figure 25 is an enlarged fragmentary detail section taken on line XXV—XXV of Figure 1 with parts in elevation.

Figure 26 is a detail view taken on line XXVI—XXVI of Figure 25.

As shown on the drawings:

The reference numeral 1 indicates a base plate having stands 2 and 3 upon which pedestals 4 and 5 respectively are supported. Mounted on the pedestals or uprights 4 and 5 transversely of the base 1 is a stationary table 6 having diagonally positioned openings or recesses provided therein for receiving two sewing machines 7$^a$ and 7$^b$ seated therein. Supported between the upper ends of the stands 2 and 3 is a transverse shelf 8.

Also supported transversely upon the end portions of the base 1 are two pedestals or stands 9 and 10. Secured upon the top of the stand 9 are upright bearing brackets 11, 12 and 13. Upright bearing brackets 14, 15 and 16 are rigidly supported upon the top of the stand 10. The brackets 14 and 16 have upwardly directed arms 17 and 18 respectively having guide grooves 19 therein (Figures 1 and 23).

A main driving motor 20 is mounted on the base 1 and has a driving pinion 21 supported on the motor shaft. Meshing with the pinion 21 is a large gear 22 which is connected to drive a speed reducer 23. The speed reducer 23 is directly connected to operate a mainshaft 24 on which are mounted all of the intermittent gears for the different movements and operations.

There are provided four groups of gear mechanisms which respectively control the cloth feeding, the cloth clamping, the sewing and thread cutting operations of the machine. These gear groups are illustrated in Figure 4 in assembled relation connected with the main shaft 24.

The sewing gear control mechanisms comprise a mutilated or intermittent sewing gear 25 having a tooth segment of 208 degrees which will produce a movement of 120 degrees of one revolution for the sewing operation. The sewing gear 25 is mounted on the shaft 24 adjacent the speed reducer 23 and is in mesh with a gear 26 supported on a bracket 27. A gear 28 is secured against one face of the gear 26 and will make one half of a revolution for each revolution of the intermittent gear 25. Gear 28 meshes with a smaller gear 29 which is adapted to make one complete revolution during the 120 degrees allowed for the sewing operation. The gear 29 is connected to drive a speed changer 30 adapted to increase the speed transmitter thereto. Mounted on the other end of the speed changer 30 is a sprocket 31 around which an endless chain 32 is trained. The chain 32 passes through an opening in the shelf 8 and is also trained around a sprocket 33 mounted on a shaft 34. The shaft 34 is journalled in bearing bracket 35 and a bearing sleeve 36 supported upon a bearing bracket on the shelf 8 (Figures 3 and 8). A sprocket 37 is mounted on the outer end of the shaft 34. Trained around the sprocket 37 is an endless silent chain 38 which is also trained around a gear 39. The gear 39 is mounted on the end of the main shaft of the sewing machine 7$^a$ thereby completing the drive to the sewing machine 7$^a$.

Mounted on the inner end of the shaft 34 is a bevel gear 40 (Figure 9) which meshes with an intermediate bevel gear 41 supported on the bearing bracket 42. Also meshing with the bevel gear 41 is a bevel gear 43 which is supported on the inner end of a shaft 44. The shaft 44 is journalled in suitable bearing sleeves on the bracket 42 and in a bearing bracket 45 on the shelf 8 (Figure 3). A sprocket 46 is mounted on the outer end of the shaft 44 and has trained therearound a silent chain 47. The chain 47 is also trained around a sprocket 48 mounted on one end of the mainshaft of the sewing machine 7ᵇ to operate the same. The bevel gears 40, 41 and 43 reverse the direction of drive to the sewing machine 7ᵇ.

The feeding of the cloth from stitch to stitch to accomplish the sewing of gloves is done automatically by the following mechanisms. Mounted on the shaft 44 within a frame 49 is a cam disk 50 having a peripheral cam or spiral groove 51 in which a plurality of rollers 52 are adapted to track. The rollers 52 (Figures 17 and 19) are rotatably supported in a circle on the under side of a disk or wheel 53 which is provided with a square opening to permit the wheel to be mounted on the squared section 54 of a vertical stub shaft 55. The stub shaft 55 is journalled in a bearing of the frame 49 and has a tracer pinion 56 on the upper portion thereof. Rotation of the cam disk 50 causes co-action with the rollers 52 and of the wheel 53 and the tracer pinion 56. As shown in Figure 9 the ends of the cam groove 51 open through the side flanges on the disk 50 to permit the rollers 52 to enter and leave said groove 51 thereby causing rotation of the wheel 53. Each roller 52 remains in the groove 51 until the cam disk 50 has made one complete revolution, thus locking the driven wheel 53 against rotation.

The tracer pinion 56 is rotated with the wheel 53 and is in mesh with a pattern rack 57 comprising a plurality of rack sections fitted together and secured to a mounting plate 58 as illustrated in Figure 16. The pattern rack 57 has the sections arranged in the form of a continuous rack having a double glove contour. The rack carrying plate 58 is provided with a continuous guide groove 59 also having a double glove contour to the outside of the contour of the rack 57. A projection or guide pin 60 is formed axially on the upper end of the tracer pinion 56 and tracks in the guide groove 59 thereby keeping the pinion 56 in mesh with the rack 57 at all times. When the tracer pinion 56 is rotated it co-acts with the rack 57 and causes movement of the plate 58 in a horizontal plane transversely and longitudinally of the machine describing in its movement the shape of a double glove to be sewed by the sewing needles of the sewing machines 7ᵃ and 7ᵇ respectively.

The movable plate 58 is secured to blocks or sleeves 61 which are slidable on guide rods 62 thus permitting a reciprocating movement longitudinally of the machine. The rods 62 are supported at one end by sleeves 63 slidably mounted on a transverse shaft 64 (Figure 1), the ends of which are supported by bearings formed on the brackets 11 and 13. The left ends of the rods 62 (looking at Figure 1) are supported in sleeves 65 slidable on a transverse shaft 66. The shaft 66 is supported by bearings formed on the brackets 15 and 16. The plate 58 is thus mounted to slide both longitudinally and transversely of the machine.

Rigidly supported on the supporting blocks or sleeves 61 (Figure 9) of the tracer plate 58 are two transversely disposed brackets 67, each of which supports a transverse bar 68. The bars 68 support a sewing table or lower cloth clamping plate 69. The clamping plate 69 has secured on the longitudinal margins thereof side Z-rails 70 between which the upper cloth clamping plate 71 is positioned. Both of the clamping plates 69 and 71 are cut away at their central portion to afford a pair of offset or staggered communicating openings 72 (Figure 1), each shaped to roughly follow the contour of a double glove to permit the sewing needles to sew or stitch double glove outlines 73 (Figure 14) in two superimposed strips of endless cloth 74 carried or clamped between the two cloth clamping plates 69 and 71.

The upper cloth clamping plate 71 has secured on the longitudinal margins thereof channel bars 75 (Figure 13) which are adapted to be guided in the Z-rails 70 of the lower cloth clamping plate 69. The cloth 74 passes between the clamping plates 69 and 71 and is held tight by means of the upper clamping plate 71 by means of springs 76 coiled around rods 77 connected to the ends of the channel bars 75 (Figures 10 and 11). The springs 76 act to push the bars 75 forwardly on the screws 78 which project through inclined slots 79 in said channel bars 75. The action of the slotted bars 75 on the screws 78 due to the action of the springs 76, causes the upper clamping plate 71 to move downwardly to clamp the two layers of cloth 74 tightly in position between the plates 69 and 71 during the sewing operation.

The cloth is stitched with double glove patterns arranged in two rows with the patterns in one row staggered with respect to those of the other row (Figure 14).

The next function of the machine is the thread cutting operations produced automatically by means of the following equipment. Referring to the time chart (Figure 15) it will be noted that after the sewing operation which requires 120 degrees of one revolution, a thread cutting operation takes place requiring twelve degrees of a revolution, during which time the sewing table and the sewing mechanisms are at rest and the upper clamping plate 71 is released or opened.

Referring to Figures 4 and 7, the mainshaft 24 carries an intermediate gear 80 having a single tooth 81. This tooth is positioned to come in mesh with a gear 82 once for each revolution of the gear 81. The gear 82 is mounted on a transverse shaft 83 journalled in bearing stands 84 secured on the base 1. The gear 82 is directly connected to one side of a full seventy-five (75) tooth gear 85, which is also supported on the shaft 83. The gear 82 has fifteen teeth or stops. For each forward movement or advance of one stop of the gear 82 the gear 85 is rotated one fifteenth of a revolution so that five of the gear teeth will co-act with a five tooth pinion 86 to rotate the same one complete revolution. The pinion 86 is carried on one end of a stub shaft 87 journalled in a bearing stand 88 mounted on the base 1. A sprocket 89 is secured on the other end of the stub shaft 87 and is rotated one revolution with each revolution of the pinion 86. The thread cutting control sprocket 89 is adapted to have a chain engaged thereon to operate a standard thread cutting device. The thread cutting device is not illustrated or described since the same may be of any desired standard type and may be connected with the sewing machines 7ª and 7ᵇ. There will be two thread cutters required, both of which may be operated from the sprocket 89.

During the time that the thread cutters are operated the upper cloth clamping plate 71 is operated or released. This operation takes place immediately after the sewing operation when the sewing table 69 is at rest.

Mounted on the mainshaft 24 is an intermediate gear 90 having two teeth 91 and 92, one for releasing and the other for clamping the upper clamping plate 71. The position of the teeth 91 and 92 is determined according to the time chart (Figure 15). The two teeth are 96 degrees apart and are adapted to co-act with a fifteen tooth or stop gear 93. The gear 93 is supported on the shaft 83 and has a full tooth gear 94 directly connected to one side thereof. The gear 94 has seventy-five (75) teeth which are in mesh with a ten (10) tooth pinion 95. The pinion 95 is supported on one end of a stub shaft 96 journalled in a bearing stand 97 mounted on the base 1. A sprocket 98 is supported on the other end of the stub shaft 96 (Figure 4) and has trained there around an endless chain 99. When either of the teeth 91 or 92 engages the gear 93, said gear is rotated one-fifteenth of a revolution. Every forward movement of the gears 93 and 94 results in a half revolution of the pinion 95 and the sprocket 98.

The chain 99 is also trained around a sprocket 100 which is mounted on one end of a transverse shaft 101. The shaft 101 is supported in bearing brackets 102 and carries two clamping control cams 103 adjacent the inner ends of the two shaft supporting bearing brackets 102. Each cam 103 is formed with diametrically opposite radial shoulders 104 (Figure 11). During one half of each revolution of the cams 103 the enlarged halves of the cams advance toward and enter slots 105 (Figure 10) in the lower clamping plate 69 with the advance shoulders 104 of the cams contracting against the lower or tip ends of a pair of dogs or plates 106 which are rigidly secured to the inner faces of the channel bars 75 by screws or other suitable means. The lower ends of the dogs 106 are cut to afford inclined edges. The lower ends of said dogs 106 project downwardly through slots 107 in the upper clamping plate 71 and into the slots 105 of the lower clamping plate 69. The lower ends of the dogs 106 are thus positioned in the path of movement of the cams 103 so that the advance shoulders 104 of said cams contact the dogs 106 and push the same from the position illustrated in Figure 11 into that shown in Figure 10, thereby raising or releasing the upper clamping plate 71 and at the same time causing compression of the springs 76. The cloth between the clamping plates is thus released so that it may be fed forwardly ready for the sewing of additional pairs of gloves. The enlarged halves of the cams 103 serve to hold the upper clamping plate 71 in a raised or released position during the rest period until the second tooth 91 on the gear 90 completes the second half of one full revolution. When the enlarged portions of the cams 103 pass out of contact with the lower ends of the dogs 106 the compressed springs 76 press forwardly on the slidable channel bars 75 thereby causing the upper clamping plate 71 to move downwardly into clamping position to hold the cloth tightly in place for the next sewing operation in the second cycle of operations as covered by the time chart (Figure 15).

The cloth feeding operation takes place during the interval that the upper clamping plate 71 is in its raised or release position. Referring to the time chart (Figure 15) it will be noted that after a clamping operation of the cloth the upper clamping plate is released or opened during a time interval of twelve degrees (12°), after which thirty-six degrees (36°) are allowed to feed the cloth 74 forwardly between the clamping plates 69 and 71 ready for the next sewing operation.

Mounted on the mainshaft 24 to the outside of a bearing bracket 108 is an intermediate gear 109 having a tooth section of eleven (11) teeth which will describe a movement through a period of thirty-six degrees (36°), during which time the teeth on the gear 109 co-act with a gear 110 mounted on the shaft 83. The gear 110 has fifty-five (55) teeth and five (5) stops, and has secured on one side thereof a full tooth gear 111 which is also supported on the shaft 83. The full tooth gear 111 is in mesh with a pinion 112 having fifteen (15) teeth and adapted to make a complete revolution with each advance of the gear 111 by the gears 109 and 110. The pinion 112 is mounted on the outer end of a stub shaft 113 supported in a bearing bracket 114 on the base 1 (Figure 5). A sprocket 115 is supported on the inner end of the stub shaft 113 and has trained therearound an endless chain 116. The chain 116 is also trained around a sprocket 117 mounted on the shaft 64. A sprocket 118 is also mounted on the shaft 64 adjacent the inner side of the sprocket 117 and has an endless chain 119 trained therearound. The chain 119 is also trained around a sprocket 120 mounted on one end of a shaft 121 journalled in the bearing brackets 12 and 13. A lower cloth feed roller 122 is carried on the shaft 121 (Figure 3) and has a gear 123 engaged on one end thereof. The gear 123 meshes with a gear 124 mounted on one end of an upper cloth feed roller 125. The ends of the shaft carrying the upper roller 125 are journalled in spring controlled bearing boxes (Figure 2) mounted in slotted arms 126 formed on the upper ends of the bearing brackets 12 and 13.

Three revolutions of the feed rollers 122 and 125 will feed into the machine an amount of cloth 74 sufficient for the sewing of the next set of gloves. The two layers of cloth 74 are pulled off of cloth reels not shown and pass from between the feed rollers 122 and 125 upwardly over idler rollers 127 carried by a spring or weight controlled suspended bracket 128 (Figure 2). The resiliently supported bracket 128 and the roller 127 serve to hold the cloth properly tensioned. From the roller 127 the cloth passes downwardly underneath a guide rail or rod 129, the ends of which are looped (Figure 3) and secured in the top of the bearing stands 11 and 13. From the guide rail 129 the cloth passes between the clamping plates 69 and 71 and out between an upper feed roller 130 and a lower feed roller 131. The trunnions of the upper roller 130 (Figure 24) are journalled in spring controlled bearing blocks 132 slidably engaged in slotted brackets 133 secured to ends of the side rails 70 near the discharge end of the machine. The trunnions of the lower feed roller 131 are journalled in the lower portions of the brackets 133. A gear 134 is mounted on one end of the upper roller 130 and meshes with a driving gear 135 mounted on one end of the lower roller 131. The middle portion of the lower roller 131 is cut away at 136 (Figure 24) leaving a shaft section 137 on which a helical pinion 138 is engaged. Meshing with the helical pinion 138 is a helical gear 139 keyed on a tubular shaft 140 rotatably engaged on one of the longitudinal guide rods 62. The hollow shaft 140 is journalled in one end of an elbow bracket 141 the other end of which is engaged on the shaft 66 between the sleeves 76 (Figure 22). Keyed on the hollow shaft 140 between the elbow bracket 141 and one of the sleeves 65 is a bevel gear 142 which meshes with a bevel gear 143 mounted on the shaft 66 between the elbow bracket 141 and one of the sleeves 65.

The sewed strips of cloth 74 after passing between the feed rollers 130 and 131 are conducted downwardly and pass beneath a guide rail or rod 144 looped near the ends as at 145 (Figure 25) and having the ends secured in the tops of the bearing brackets 15 and 16. From the guide rail 144 the cloth is conducted upwardly over a take-up roller 146 and passes over a cloth winding roller 148, the trunnions of which are journalled in the brackets 14 and 16. A sprocket 149 is mounted on one of the trunnions of the roller 148 and has an endless chain 150 trained therearound. The chain 150 is also trained around a sprocket 151 keyed on the shaft 66 to the inside of a sprocket 152 (Figure 25). Trained around the sprocket 152 is an endless chain 153 which is also trained around a sprocket 154 mounted on the shaft 64 to the outside of the sprocket 117. Positioned above the winding up roller 148 (Figure 23) is a cylindrical core 155 having trunnions 156 which are positioned to slide in the upright grooves 19 of the arms 17 and 18. The sewed cloth is adapted to be wound up on the core 155 and as the diameter of the roll of cloth increases the core gradually moves upwardly in the grooves 19 away from the winding roller 148. The core of cloth does not require a direct drive since the friction of the winding roller 148 is sufficient to rotate the core 155 and the roll of cloth thereon.

The operation is as follows:

Having described the automatic glove sewing machine in detail, attention is specifically directed to Figure 15 of the drawings which illustrates a time chart of the cycle of operations. The time chart illustrates the various operations of the glove making machine, and furthermore illustrates the timed relation of said operations in seconds and degrees. The duration of the feeding, clamp operating, thread cutting and sewing mechanisms is clearly shown on the time chart, which also gives the rest intervals for said various mechanisms.

The automatic glove sewing machine is operated by the driving motor 20 which in turn actuates the pinion 21 and the large gear 22. The drive from the motor 20 is thus imparted to the speed reducer 23 which operates the main control shaft 24. The control shaft 24 has the intermittent gears 25, 80, 90 and 109 mounted thereon, said gears respectively governing the operation of the sewing mechanisms, the thread cutting mechanisms, the cloth clamping mechanisms and the cloth feeding mechanisms, as hereinafter described in detail.

Two layers or strips of cloth 74 are rolled upon a supply roller with the nap of said strips of cloth facing outwardly. The supply roller may be conveniently mounted in any desired manner in the entrance or right-hand end of the machine, looking at Figures 1 and 2. From the supply roller the superimposed strips of cloth enter the machine by passing between the entrance feed rollers 125 and 122. The lower feed roller 122 receives its drive from the chain 119, which in turn receives its drive from the chain 116 trained around the sprocket 115. The sprocket 115 is associated with the cloth feeding gears illustrated in Figures 4 and 5.

A cycle of operations will now be described starting with a cloth feeding operation at a point on the time chart corresponding with the twenty-two seconds (22") or one hundred and thirty-two degrees (132°) line illustrated by the arrow in Figure 15 illustrating the time chart. By referring to Figure 4 it will be noted that the various control or intermediate gears on the shaft 24 are simultaneously rotated and are so positioned that the teeth on said control gears actuate at predetermined times the various mechanisms of the machine.

The two layers of cloth 74 enter the machine between the rollers 125 and 122 and pass upwardly over the suspended idler roller 127 and downwardly beneath the guide rail 129 (Figure 2) before passing over the lower clamping plate 69 and below the upper clamping plate 71. When the teeth on the intermittent gear 109 are moved into meshing engagement with the teeth on the gear 110, said gear 110 and the adjacent gear 111 are rotated through an arc of thirty-six degrees (36°), thereby causing the pinion 112 to make a complete revolution with each advance or operation of the gear 111 by the gears 109 and 110. The pinion 112 causes a complete rotation of the sprocket 115 thereby causing operation of the chains 116 and 119 so that the lower feed roller 122 is rotated and imparts a drive to the upper feed roller 125 by means of two intermeshing gears 123 and 124. The two layers of cloth 74 are thus advanced or fed into the machine a predetermined distance between the clamping plates 69 and 71. When the cloth feeding operation takes place (see Figure 15), the remaining mechanisms of the machine controlled by the remaining intermediate gears on the shaft 24 are at rest. With the upper clamping plate 71 in its elevated or release position, as shown in Figure 10, due to the fact that the cams 103 have the enlarged portions thereof in contact with the shoes 106 so that the channel bars 75 are moved over the screws 78 into the position shown in Figure 10, in which position the springs 76 are compressed. The cloth being positioned between the open clamping plates on the sewing table, the next function of the machine is the cloth clamping function. The intermediate gear 90 on the shaft 24 is now in a position in which the tooth 91 is moved into meshing engagement with the control gear 93, thereby causing rotation of said gear 93 and its adjacent full toothed gear 94. The gear 94 is provided with seventy-five teeth and is thus rotated one-fifteenth of a revolution or twenty-four degrees (24°) so that the ten toothed pinion 95 is rotated through one-half of a revolution, as is also the sprocket 98, which is mounted on the same stub shaft as the pinion 95. Rotation of the sprocket 98 through one-half of a revolution causes operation of the chain 99 and rotation of the sprocket 100 and the cam shaft 101 through one-half of a revolution. The cams 103 are thus also rotated one-half of a revolution so that the enlarged cam portions of said cams move out of engagement with the shoes 106, thereby permitting the compressed springs 76 to exert a pushing force on the channel bars 75 to slide said bars to the left, looking at Figure 10, and causing said bars to move downwardly to force the upper clamping plate into clamping engagement with the cloth positioned between the clamping plates. The inclined slots 79 in the channel bars 75 moving on the screws 78 cause the downward clamping movement of the upper clamping plate 71. The slidable channel bars 75 supporting the upper clamping plate 71 are limited in their sliding movement by the length of the slots 107 through which the shoes 106 project. It will thus be noted that the clamping operation of the cloth takes place during a short interval of twelve degrees (12°) or two seconds (2") when the feeding, thread cutting and sewing mechanisms are at rest.

The two layers of cloth are now clamped in position between the sewing table clamping plates 69 and 71 ready for a sewing operation. At this point in the cycle of operations, the intermediate gear 25 on the shaft 24 is moved into position so that the teeth thereon come into meshing engagement with the teeth of the two stop gear 26 (Figure 8). The intermediate gear 25 has a toothed segment of 208 degrees (208°), and, meshing with the gear 26, causes the same to rotate through one-half of a revolution for each complete revolution of the intermediate gear 25. The gear 28 adjacent the gear 26 is also rotated through one-half of a revolution, and being in mesh with the small gear 29, causes said gear 29 to rotate through a complete revolution during the 120 degrees (120°) allowed for the sewing operation. The gear 29 drives the speed changer 30 to cause an increased speed to be transmitted to the sprocket 31 driven by the speed changer 30. The chain 32 trained around the sprocket 31 is thus operated to transmit a drive to the sprocket 37 and the shaft 34. Rotation of the shaft 34 causes a drive to be transmitted to the sewing machine operating chains 38 and 47, thereby causing simultaneous operation of both of the sewing machines 7ª and 7ᵇ.

The machine is adapted to automatically feed the clamped cloth on the sewing table to the sewing needles of both of the sewing machines 7ª and 7ᵇ, from stitch to stitch at a rate of speed corresponding to the speed of the sewing machine needles. The automatic feeding of the clamped cloth to the sewing machine needles is accomplished by means of the grooved cam disk 50 on the shaft 44 (Figure 9). Rotation of the cam disk 50 causes the cam to co-act with the rollers 52 on the wheel 53, thereby causing rotation of the wheel 53 and the tracer pinion 56. As illustrated in Figures 17 to 21 inclusive, the tip of the pin 60 on the tracer 61 follows or moves in the guide groove 59 of the rack carrying plate 58 thus holding the tracer pinion 56 in meshing, co-acting relation with the continuous glove pattern rack 57. Referring to Figure 16, it will be noted that the pattern rack 57 has a double glove shaped contour.

The tracer pinion 56 being rotated by the wheel 53 causes movement of the plate 58 and the cloth clamping or sewing table in a horizontal plane transversely and longitudinally of the machine. The movement thus transmitted to the sewing or clamping table of the machine describes a double glove movement to permit the sewing needles of the sewing machines 7ª and 7ᵇ to simultaneously stitch the clamped cloth with a pair of double glove stitchings which are off-set or staggered with respect to one another, as clearly illustrated in Figure 14 of the drawings. As shown by the time chart (Figure 15), the sewing operation takes place for 120 degrees (120°), during which time the feeding, sewing and thread cutting mechanisms are at rest. The superimposed layers of cloth 74 having been automatically stitched with double glove outlines, the machine is now ready to automatically cause cutting of the threads from the sewing machines and automatic opening or releasing of the upper cloth clamping plate 71. During the thread cutting and the clamp releasing operations, the cloth feeding and sewing mechanisms are at rest.

Figure 7 of the drawings clearly illustrates the thread cutting gear mechanisms. At this point in the cycle of operations the tooth 81 on the intermediate thread cutting control gear 80 is now brought into a position to mesh with the fifteen toothed and stop gear 82. The full tooth gear 85 adjacent the gear 32 is thus rotated one-fifteenth of a revolution so that five of the gear teeth thereof will co-act with the five toothed pinion 86, thereby causing rotation of said pinion through one complete revolution each time the gear tooth 81 comes into meshing engagement with the gear 82. Rotation of the pinion 86 causes one complete revolution of the sprocket 89 so that a drive is transmitted at a predetermined time in the cycle of operations to a pair of thread cutting mechanisms. The thread cutting mechanisms may be of any desired standard type, and for the sake of clearness have not been illustrated in the drawings or described in the specification, except in a general way.

The thread cutting mechanisms may be mounted, as is customary, in a convenient position for the purpose of cutting the threads from the sewing machines 7ª and 7ᵇ. The thread cutting operation, as illustrated on the time chart (Figure 15), takes place during a period of two seconds (2″) or twelve degrees (12°) and occurs at the same time that the upper cloth clamping plate is automatically opened or released.

At this stage in the cycle of operations, the tooth 92 on the intermediate gear 90 comes into meshing engagement with the gear 93 at the time that the tooth on the gear 81 comes into meshing engagement with the gear 82. The tooth 92 on the gear 90 thus causes the gear 93 to be rotated through one-fifteenth of a revolution, so that the full tooth gear 94 will cause the pinion 95 to rotate through one-half of a revolution. The sprocket 98 is thus also rotated through one-half of a revolution and operates the chain 99, thereby causing rotation of the cam shaft 101 and the cams 103 through one-half of a revolution so that the enlarged cam portions of the cam 103 are brought into co-acting engagement with the shoes 106 of the channel bars 75. The bars 75 are thus caused to move upwardly and slide outwardly toward the entrance end of the machine with the inclined slots 79 co-acting with the screws 78 causing the upper clamping plate 71 to be moved away from the lower clamping plate 69, thereby releasing the stitched portion of the cloth carrying the double glove stitchings. When the thread cutting and clamp releasing or opening operations are completed, said clamping, thread cutting and sewing mechanisms again remain at rest while the cloth feeding operation of the second cycle of operations begins.

It will thus be seen that the two layers of superimposed cloth are adapted to be automatically fed into the machine between the clamping plates a predetermined distance at regular time intervals, after which the cloth clamping, glove stitching and thread cutting mechanisms automatically come into operation so that the two layers of cloth are automatically stitched with two longitudinal rows of double glove stitchings, with the double glove stitchings of one row offset or staggered with respect to those of the other row, as clearly illustrated in Figure 14 of the drawings.

Each time a set of double glove stitchings are sewed in the cloth, the cloth is advanced through the machine a predetermined distance and moves outwardly from between the clamping plates 69 and 71 and passes between the cloth feed rollers 130 and 131. These rollers receive their drive from the helical gear 139 and the helical pinion gear 138 driven thereby (Figure 24). The helical gear 139 is operated by the hollow shaft 140 (Figure 22), which in turn receives a drive from the meshing bevel gears 142 and 143. The bevel gear 143 is mounted on the shaft 66, which is operated by means of the endless chain 153 from the shaft 64. Rotation of the shaft 66 causes operation of the endless chain 150 and operation of the lower friction feed roller 148. The stitched cloth after passing between the feed rollers 130 and 131, passes downwardly beneath a second guide rail 144 and then upwardly over the suspended idler roller 146. From the roller 146 the stitched cloth passes downwardly above the friction feed roller 148 which causes the stitched cloth to be fed onto the core 155. The friction between the roller 148 and the cloth causes rotation of the core 155 so that the stitched cloth is gradually wound up on said core. As the diameter of the roll of stitched cloth on the core 155 increases, the trunnions 156 (Figure 23) slide upwardly in the grooves 19 of the bracket arms 18. When a sufficient quantity of cloth has been automatically stitched with double glove stitchings, the stitched roll of cloth, together with the core 155, may be removed from the glove stitching machine by first cutting the stitched cloth transversely along an irregular line, as indicated at the right-hand end of Figure 14, at a point between the idler roller 146 and the friction feed roller 148. The removed roll of stitched cloth may now be moved to a glove cutting machine provided with suitably shaped cutting dies and punches adapted to automatically cut out the double gloves from the stitched cloth at a suitable distance, approximately one-eighth of an inch, from the glove seams.

As the double gloves are cut from the cloth by the glove cutting machine, which also cuts the double gloves transversely across the middle portion, the gloves which are sewed inside-out will be automatically turned inside-in by a suitable glove turning machine which forms no part of the present invention.

I am aware that many changes may be made, and numerous details of construction may be varied through a wide range without departing from the principles of this invention, and I therefore do not propose limiting the patent granted hereon, otherwise than necessitated by the prior art.

I claim as my invention:

1. An automatic glove sewing machine comprising a shiftable table, a plurality of sewing machines, cloth clamping means on said table, means for automatically feeding cloth between said clamping means at predetermined times, means for automatically operating the clamping means to hold the cloth tightly in position on said table, a tracer rack carried by said table, a tracer pinion meshing therewith, and means for automatically operating said tracer pinion at predetermined times to cause the pinion to co-act with said tracer rack to automatically shift the table through a predetermined path to cause automatic feeding of the clamped cloth to the sewing machines to cause a plurality of glove patterns to be simultaneously stitched in the clamped cloth.

2. An automatic glove sewing machine comprising a sewing mechanism, a movable cloth clamping table, means for automatically feeding cloth to said table at a predetermined time, a mechanism for automatically causing the cloth to be clamped on the said table at a predetermined time, a glove pattern rack carried by the table, tracer means coacting therewith, a mechanism for operating the tracer means at a predetermined time to cause the tracer rack and said cloth clamping table to be shifted through a path conforming to the outline of said pattern rack to cause the sewing mechanism to stitch an outline in the cloth corresponding to the outline of said pattern rack, means for automatically operating said tracer means at a predetermined time, and means for automatically operating a thread cutting mechanism at a predetermined time.

3. An automatic glove sewing machine comprising a shiftable cloth clamping table, sewing mechanisms associated therewith, cloth feeding means adapted to be actuated at a predetermined time to cause cloth to be fed to said cloth clamping table, means for automatically operating said cloth clamping table at a predetermined time to cause cloth thereon to be clamped in position, rack and pinion pattern mechanisms adapted to be operated at predetermined times to cause the cloth clamping table to be shifted through a predetermined path to cause the cloth on said table to be automatically fed to said sewing mechanisms to cause glove outlines to be automatically stitched in the clamped portion of said cloth, means for automatically driving thread cutting mechanisms at predetermined times to cut the threads from said sewing mechanisms as the glove patterns have been stitched in the clamped cloth, means for automatically releasing the clamped cloth on said clamping table to permit the stitched section of the cloth to be advanced through the cloth clamping table when a fresh section of the cloth is advanced for the next sewing operation.

4. The combination with an automatic glove sewing machine of a cloth feeding mechanism, a cloth clamping mechanism, a cloth sewing mechanism, a thread cutter driving mechanism, a control shaft, a plurality of mutilated intermediate gear mechanisms on said control shaft co-acting with said various mechanisms, and means for operating said control shaft and the intermediate gears thereon to cause said mechanisms to operate at predetermined times to cause glove outlines to be automatically stitched in cloth clamped in the machine.

5. In an automatic glove sewing machine, the combination with a group of cloth feeding control gears, cloth feeders operated thereby, a group of cloth clamping control gears, cloth clamping plates operable thereby, a group of thread cutter control gears, a group of cloth sewing control gears, sewing mechanisms connected to be operated thereby, a speed increase mechanism connected to be operated by said group of cloth sewing control gears, a shaft, a plurality of intermittent gears mounted thereon to co-act with said various groups of control gears, a speed reducer mechanism connected with said shaft, and a driving means connected to operate said speed reducer mechanism.

6. In an automatic glove sewing machine, the combination with a sewing device, of a sewing table, a slotted lower cloth clamping plate carried thereby, a spring controlled upper cloth clamping plate supported above said lower cloth clamping plate, cam means for operating said upper cloth clamping plate to move the same into open position against the action of said springs, control gears for governing the operation of said cam means at predetermined times, and a driving means connected to operate said control gears.

7. In an automatic glove sewing machine, the combination with a movable cloth carrying slotted table, rails supported thereon, bars slidably mounted on said rails, springs controlling the operation of said bars, a slotted clamping plate carried by said bars, shoes on said bars projecting through said slotted clamping plate and into said slotted table, said bars having inclined slots therein, screws projecting through said inclined slots and secured to said rails, a cam shaft, a plurality of cams mounted thereon adapted to co-act with said shoes, a group of control gears for driving said cam shaft, a two toothed intermediate gear co-acting with said group of control gears to cause operation thereof at predetermined times, and means for driving said intermediate gear.

8. In an automatic glove forming machine, the combination with a slotted sewing table, of a spring controlled slotted clamping plate movably supported thereon, cams co-acting with said clamping plate to move and hold the same in a release position at predetermined times, gear mechanisms for operating said cams, an intermediate gear co-acting with said gear mechanisms to cause operation of said gear mechanisms at predetermined times, a shaft for supporting said intermediate gear, a speed reduction device connected to operate said shaft, gear mechanisms for driving said speed reduction mechanism, and a motor for operating said gear mechanisms.

9. In an automatic glove sewing machine, the combination with a sewing table, of a cloth clamping plate thereon, a mechanism for governing the operation of said cloth clamping plate to move the same into clamping and into release position at predetermined times, a pattern rack carried by the table having a contour corresponding to that of the pattern to be stitched by the sewing machine, a pinion for operating said rack, a wheel supporting said pinion, rollers carried by said wheel, a grooved cam disk adapted to co-act with said rollers to cause rotation of said wheel and movement of said rack, and means for driving said cam disk.

10. In an automatic glove sewing machine, the combination of sewing mechanisms, of a cloth clamping movable table, of cloth feed rollers, means for operating the same at predetermined times to cause cloth to be fed to said cloth clamping table, means for operating the cloth clamping table to cause the cloth to be fed to said sewing mechanisms, means for governing the movement of said cloth clamping table to cause a predetermined design to be stitched in the cloth by said sewing mechanisms, means for causing the cloth clamping table to release the cloth after a sewing operation at a predetermined time, driving means for operating thread cutting mechanisms from the machine, roller mechanisms operated from the machine for causing the sewed cloth to be moved out of said clamping table and advanced through the machine, and a core supported on the machine adapted to have the stitched cloth wound thereon.

In testimony whereof I have hereunto subscribed my name.

OTTO G. SCHMITT,